(12) United States Patent
Watanabe

(10) Patent No.: US 7,948,688 B2
(45) Date of Patent: May 24, 2011

(54) LENS APPARATUS AND IMAGE PROJECTION APPARATUS

(75) Inventor: Takashi Watanabe, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 182 days.

(21) Appl. No.: 12/474,701

(22) Filed: May 29, 2009

(65) Prior Publication Data
US 2009/0296215 A1 Dec. 3, 2009

(30) Foreign Application Priority Data

Jun. 2, 2008 (JP) .................................. 2008-145193

(51) Int. Cl.
*G02B 15/14* (2006.01)
(52) U.S. Cl. ......... 359/699; 359/700; 359/703; 396/349
(58) Field of Classification Search .......... 359/694–704; 396/62, 72, 73, 75, 84, 85, 349; 348/340
See application file for complete search history.

(56) References Cited

U.S. PATENT DOCUMENTS

| | | | |
|---|---|---|---|
| 5,805,353 A | 9/1998 | Ichino | |
| 6,751,032 B2 * | 6/2004 | Nomura et al. | 359/819 |
| 6,778,334 B2 * | 8/2004 | Nomura et al. | 359/701 |
| 7,561,353 B2 * | 7/2009 | Shirakata | 359/819 |
| 7,839,579 B2 * | 11/2010 | Iwasaki | 359/700 |
| 7,864,241 B2 * | 1/2011 | Iwasaki | 348/360 |

FOREIGN PATENT DOCUMENTS

| | | |
|---|---|---|
| JP | 06-194555 A | 7/1994 |
| JP | 2001-116975 A | 4/2001 |
| JP | 2002-006196 A | 1/2002 |
| JP | 2006-235287 A | 9/2006 |

* cited by examiner

*Primary Examiner* — Loha Ben
(74) *Attorney, Agent, or Firm* — Canon USA, Inc. IP Division

(57) ABSTRACT

The lens apparatus which includes a lens system, a cam barrel including a cam surface, and a moving barrel provided with a cam follower in contact with the cam surface and configured to be moved in a direction of an optical axis of the lens system by rotation of the cam barrel around the optical axis. The cam surface is parallel to a direction orthogonal to the optical axis. The cam barrel includes a tapered surface inclining with respect to the direction orthogonal to the optical axis. The moving barrel is provided with a tapered follower in contact with the tapered surface and a pressing mechanism configured to bias the tapered follower in the direction orthogonal to the optical axis so as to press the tapered follower against the tapered surface to thereby press the cam follower against the cam surface in the direction of the optical axis.

6 Claims, 3 Drawing Sheets

LENS APPARATUS AND IMAGE PROJECTION APPARATUS

BACKGROUND OF THE INVENTION

The present invention relates to a lens apparatus in which two barrel members (for example, a cam barrel and a moving barrel) are relatively moved in an optical axis direction by a cam mechanism, the lens apparatus being suitable for, for example, a projection lens used in an image projection apparatus.

An image projection apparatus projects through a projection lens an enlarged image corresponding to an original image formed on an image-forming element (light-modulating element) such as a liquid crystal panel and a digital micromirror device (DMD) onto a screen. Such an image projection apparatus is demanded to improve positional accuracy of movable lens units in the projection lens in order to improve quality of the projected image. Therefore, in a projection lens in which the movable lens units are moved by a cam mechanism to perform zooming or focusing, it is necessary to reduce positional shifting, tilting and decentering of the movable lens units occurring due to backlash in the cam mechanism.

A projection lens disclosed in Japanese Patent Laid-Open No. 2006-235287 employs a configuration in which a spring is inserted into a tapered cam follower provided on a moving barrel and the spring biases the tapered cam follower toward a center of a tapered cam groove formed on a cam barrel.

A lens apparatus disclosed in Japanese Patent Laid-Open No. 2001-116975 employs a configuration in which two movable lens units are pulled by a spring disposed therebetween in directions approaching each other and thereby cam followers provided on the two movable lens units are pressed against cam surfaces formed on ends of a cam barrel in an optical axis direction.

A lens apparatus disclosed in Japanese Patent Laid-Open No. 2002-006196 employs a configuration in which a convex cam is formed on an outer circumferential surface of a cam barrel and the convex cam is sandwiched by two cam followers provided at two positions in an optical axis direction on an inner circumferential surface of a moving barrel such that phases of the two cam followers are mutually different.

Further, a lens apparatus disclosed in Japanese Patent Laid-Open No. 06-194555 employs a configuration in which an elastic member is attached to a cam follower inserted into a cam groove and the cam follower is pressed against an inner surface of the cam groove by an elastic force of the elastic member.

However, in the configuration disclosed in Japanese Patent Laid-Open No. 2006-235287, if mechanical accuracy of a surface of the cam groove is not extremely high, the moving barrel hung by the cam follower may be tilted or decentered with respect to an optical axis.

In the configuration disclosed in Japanese Patent Laid-Open No. 2001-116975, if a distance between the movable lens units pulled by the spring in the directions approaching each other, a pressing force of the cam follower against the cam surface is increased or decreased, thereby changing a rotational load (torque necessary for rotation) of the cam barrel.

In the configuration disclosed in Japanese Patent Laid-Open No. 2002-006196, low mechanical accuracy of the two cam followers sandwiching the convex cam may reduce smoothness of rotation of the cam barrel.

Further, in the configuration disclosed in Japanese Patent Laid-Open No. 06-194555, when the cam groove is manufactured, since a center of the cam follower and that of the cam groove are shifted from each other, the manufacturing becomes difficult.

SUMMARY OF THE INVENTION

The present invention provides a lens apparatus capable of reducing backlash in a cam mechanism having a configuration easily manufactured, thereby improving optical performance, and an image projection apparatus with the lens apparatus.

The present invention provides as one aspect thereof a lens apparatus which includes a lens system, a cam barrel including a cam surface, and a moving barrel provided with a cam follower in contact with the cam surface and configured to be moved in a direction of an optical axis of the lens system by rotation of the cam barrel around the optical axis. The cam surface is parallel to a direction orthogonal to the optical axis. The cam barrel includes a tapered surface inclining with respect to the direction orthogonal to the optical axis. The moving barrel is provided with a tapered follower in contact with the tapered surface and a pressing mechanism configured to bias the tapered follower in the direction orthogonal to the optical axis so as to press the tapered follower against the tapered surface to thereby press the cam follower against the cam surface in the direction of the optical axis.

The present invention provides as another aspect thereof a lens apparatus which includes a lens system, a first barrel member including a cam surface, and a second barrel member provided with a cam follower in contact with the cam surface. The first and second barrel members are relatively moved in a direction of an optical axis of the lens system by relative rotation of the first and second barrel members around the optical axis. The cam surface is parallel to a direction orthogonal to the optical axis. The first barrel member includes a tapered surface inclining with respect to the direction orthogonal to the optical axis. The second barrel member is provided with a tapered follower in contact with the tapered surface and a pressing mechanism configured to bias the tapered follower in the direction orthogonal to the optical axis so as to press the tapered follower against the tapered surface to thereby press the cam follower against the cam surface in the direction of the optical axis.

The present invention provides as further another aspect thereof an image projection apparatus which includes an image-forming element configured to form an original image, and the above-described lens apparatus configured to project light from the image-forming element onto a projection surface.

Other aspects of the present invention will become apparent from the following description and the attached drawings.

DESCRIPTION OF THE EMBODIMENTS

Exemplary embodiments of the present invention will be described hereinafter with reference to the accompanying drawings.

Embodiment 1

Figure 1:
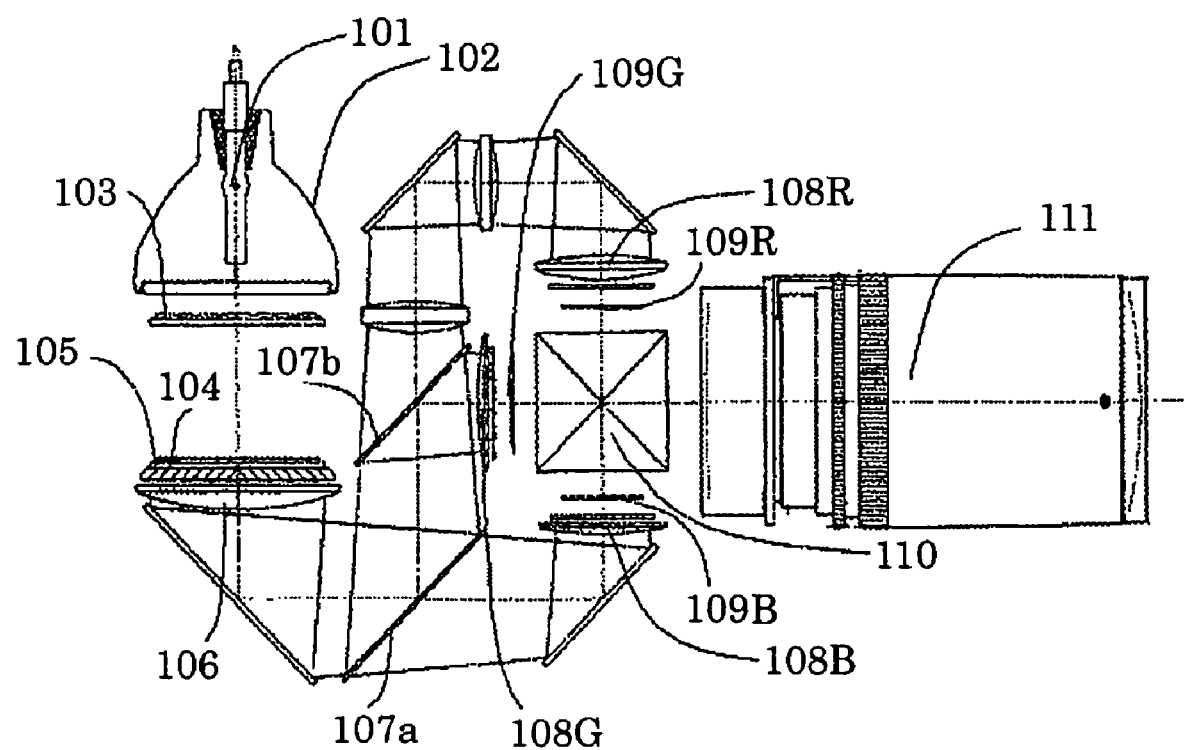
FIG. 1 shows a configuration of a projector using a projection lens barrel that is Embodiment 1 of the present invention.

FIG. 1 shows a configuration of an image projection apparatus (projector) including a projection lens barrel (lens apparatus) 111 that is a first embodiment (Embodiment 1) of the present invention.

Non-polarized white light from a light source (lamp) 101 is converted into a collimated light flux by a parabolic reflector 102 and then enters a first fly-eye lens 103. The collimated light flux is divided into plural light fluxes by the first fly-eye lens 103, and the plural divided light fluxes then enter a second fly-eye lens 104. Each divided light flux from the second fly-eye lens 104 is converted into a light flux having a specific polarization direction by a polarization conversion element 105, and the polarized light flux then enters a condenser lens 106. The condenser lens 106 overlaps the plural divided light fluxes on each of liquid crystal panels 109R, 109G and 109B to illuminate each liquid crystal panel with a homogeneous light intensity distribution.

Each divided light flux (polarized light) emerging from the condenser lens 106 is color-separated into three color light components of R, G and B by dichroic mirrors 107a and 107b. The color light components of R, G and B enter the liquid crystal panels 109R, 109G and 109B through field lenses 108R, 108G and 108B, respectively. The liquid crystal panels 109R, 109G and 109B are transmissive image-forming elements (light-modulating elements). On the liquid crystal panels 109R, 109G and 109B, original images corresponding to an input image to the projector are formed.

The three color light components image-modulated by the liquid crystal panels 109R, 109G and 109B are combined into image light by a color combination prism 110. The combined image light is enlarged and projected onto a screen (projection surface, not shown) by a lens system in a projection lens barrel 111.

Although this embodiment uses the transmissive liquid crystal panel, a reflective liquid crystal panel and a DMD (digital micromirror device) may be used as an image-forming element.

Figure 2:
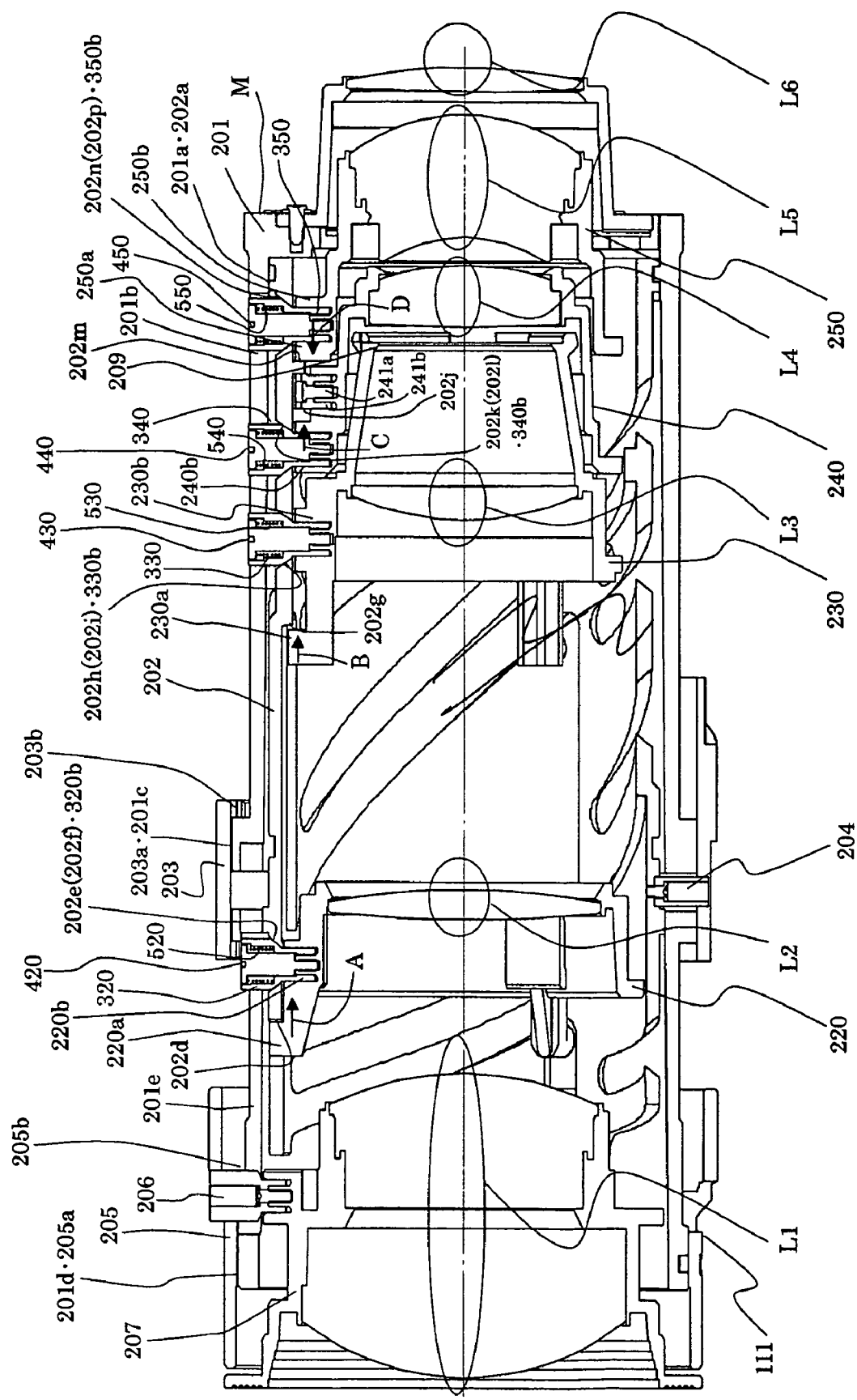
FIG. 2 is a cross-sectional view of the projection lens barrel.
Figure 3:
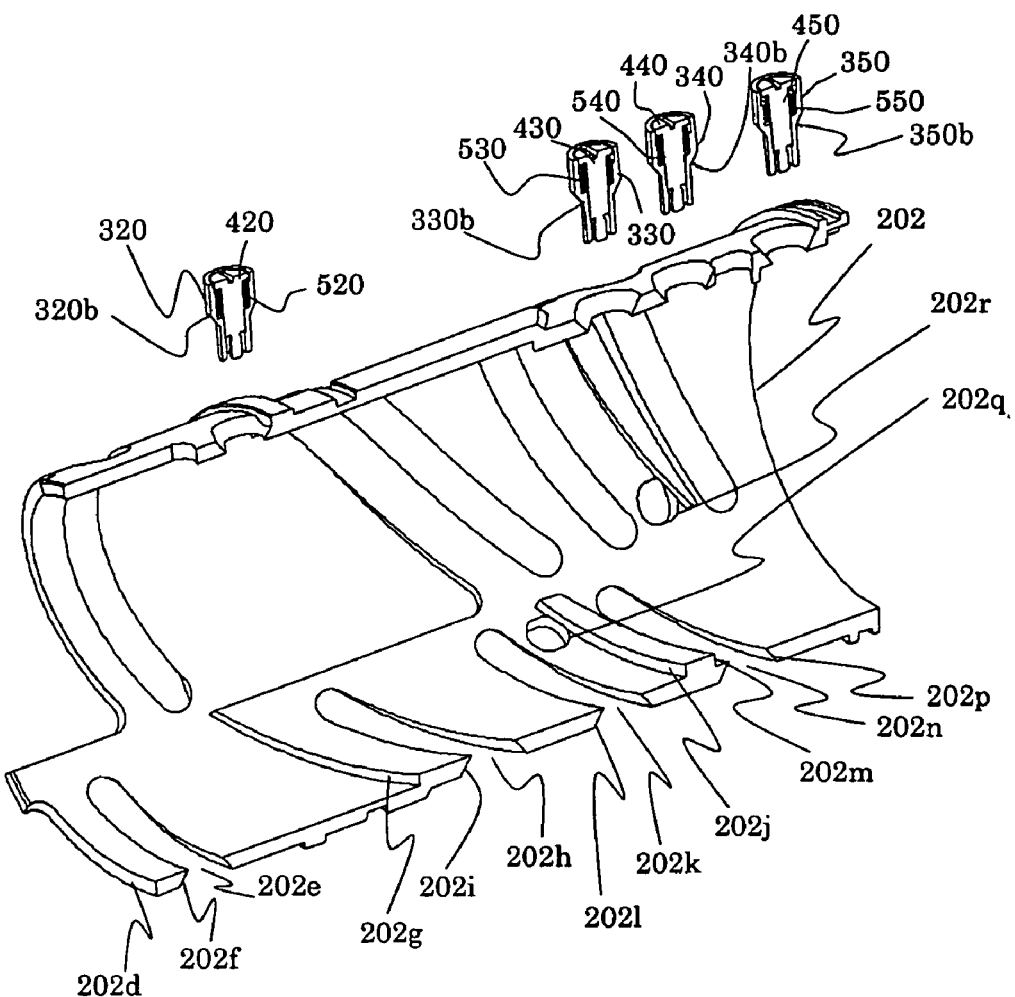
FIG. 3 is an oblique cross-sectional view of a cam barrel and a tapered follower which constitute part of the projection lens barrel.

Next, description will be made of a configuration of the projection lens barrel 111 with reference to FIGS. 2 and 3. FIG. 2 shows a section of the projection lens barrel 111, and FIG. 3 shows an oblique section of a cam barrel and a pressing mechanism which constitute part of the projection lens barrel 111.

In these figures, reference character L1 denotes a first lens unit having a negative power (refractive power), and reference character L2 denotes a second lens unit having a positive power. Reference character L3 denotes a third lens unit having a positive power, and reference character L4 denotes a fourth lens unit having a negative power. Reference character L5 denotes a fifth lens unit having a positive power, and reference character L6 denotes a sixth lens unit having a positive power. The first to sixth lens units L1 to L6 constitute a lens system (projection optical system). In the following description, the left side (first lens unit side) of FIG. 2 is referred to as "screen side", and the right side (sixth lens unit side) thereof is referred to as "panel side".

The first to fifth lens units L1 to L5 are movable lens units that are movable in a direction of an optical axis of the lens system (hereinafter referred to as "optical axis direction"). The sixth lens unit L6 is a fixed lens unit that is not moved in the optical axis direction. The first to fifth lens units L1 to L5 are moved in the optical axis direction so as to vary distances thereamong to perform zooming (variation of magnification) and focusing.

A mount portion M is provided at a panel side end of a fixed barrel 201 that constitutes a main body of the projection lens barrel 111. The mount portion M is fixed to a prism base (not shown) that holds optical elements such as the color combination prism 110 with screws.

At an inner circumferential part of the fixed barrel 201, a cam barrel holding portion 201a into which an outer circumferential portion 202a of a cam barrel 202 is incorporated is formed. The fixed barrel 201 holds at the cam barrel holding portion 201a the cam barrel 202 rotatably around the optical axis of the lens system. Moreover, the fixed barrel 201 holds the sixth lens unit L6 at its panel side end (end closer to the panel than the mount portion M).

In the cam barrel 202, cam portions for moving the second to fifth lens units L2 to L5 in the optical axis direction are formed. The cam barrel 202 is a resin molding member. The cam barrel 202 corresponds to a first barrel member.

Reference numeral 220 denotes a second lens barrel which holds the second lens unit L2. Reference numeral 230 denotes a third lens barrel which holds the third lens unit L3. Reference numeral 240 denotes a fourth lens barrel which holds the fourth lens unit L4. Reference numeral 250 denotes a fifth lens barrel which holds the fifth lens unit L5. Each of the second to fifth lens barrels 220 to 250 corresponds to a moving barrel and a second barrel member.

A cam surface 202d for moving the second lens barrel 220 is formed at a screen side end face of the cam barrel 202. The cam surface 202d is formed as a surface parallel to a direction orthogonal to the optical axis (that is, parallel to a radial direction of the cam barrel 202). A cam follower 220a integrally formed on the second lens barrel 220 is in contact with the cam surface 202d in the optical axis direction.

Moreover, a guide groove portion 202e extending parallel to the cam surface 202d is formed in the cam barrel 202. The cases where the guide groove portion 202e is parallel to the cam surface 202d include not only a case where the guide groove portion 202e is completely parallel to the cam surface 202d, but also a case where the guide groove portion 202e has a certain parallelism with the cam surface 202d. This is applied to other guide groove portions described later.

At both sides of the guide groove portion 202e in its width direction corresponding to the optical axis direction, tapered surfaces 202f inclining with respect to the direction orthogonal to the optical axis such that a distance therebetween decreases toward an inner side in the radial direction of the cam barrel 202. The cam follower 220a of the second lens barrel 220 is disposed on an opposite side (screen side) to that of the guide groove portion 202e (that is, that of a taper follower 320 described later) with respect to the cam surface 202d in the optical axis direction.

A hole portion 220b is formed on an outer circumferential part of the second lens barrel 220. A tapered follower 320 is inserted into the hole portion 220b so as to be movable in the direction orthogonal to the optical axis. A mounting shaft 420 is disposed at a central portion of the tapered follower 320, and is screwed (fixed) to the second lens barrel 220.

Between the mounting shaft 420 and the tapered follower 320, a spring (biasing member) 520 is disposed which biases the tapered follower 320 toward the inner side in the radial direction of the cam barrel 202.

The mounting shaft 420 and the tapered follower 320 are inserted into the guide groove portion 202e. A tapered surface 320b of the tapered follower 320 biased toward the inner side in the radial direction of the cam barrel 202 by a biasing force of the spring 520 is pressed against the tapered surfaces 202f of the guide groove portion 202e.

The distance between the tapered surfaces 202f on both sides of the guide groove portion 202e and an outer diameter of the tapered surface 320b of the tapered follower 320 respectively decrease (become smaller) toward the inner side in the radial direction of the cam barrel 202. Therefore, the second lens barrel 220 is held at a position where a center of the mounting shaft 420 and tapered follower 320 coincides with a center of the guide groove portion 202e in its width direction. This configuration biases the cam follower 220a mounted on the second lens barrel 220 toward the panel side as shown by an arrow A to always press the cam follower 220a against the cam surface 202d in the optical axis direction.

A cylindrical portion of the tapered follower 320 also engages with a straight groove portion 201b formed in the fixed barrel 201 so as to extend in the optical axis direction. This engagement prevents rotation of the second lens barrel 220 around the optical axis.

Thus, a lift of the cam surface 202d of the cam barrel 202 rotating around the optical axis moves the second lens barrel 220 in the optical axis direction.

A cam surface 202g for moving the third lens barrel 230 is formed on an inner circumferential part of the cam barrel 202, the cam surface 202g having a smaller inner diameter than that of the cam surface 202d for moving the second lens barrel 220. The cam surface 202g is also parallel to the direction orthogonal to the optical axis. The cam follower 230a formed integrally with the third lens barrel 230 is in contact with the cam surface 202g in the optical axis direction.

Moreover, a guide groove portion 202h extending parallel to the cam surface 202g is formed on the cam barrel 202.

On both sides of the guide groove portion 202h in its width direction, tapered surfaces 202i are formed which incline with respect to the direction orthogonal to the optical axis such that a distance therebetween decreases toward the inner side in the radial direction of the cam barrel 202. The cam follower 230a of the third lens barrel 230 is disposed on an opposite side (screen side) to that of the guide groove portion 202h (that is, that of a tapered follower 330 described later) with respect to the cam surface 202g in the optical axis direction.

A hole portion 230b is formed on an outer circumferential part of the third lens barrel 230. The tapered follower 330 is inserted into the hole portion 230b so as to be movable in the direction orthogonal to the optical axis. A mounting shaft 430 is disposed at a central portion of the tapered follower 330, and is screwed (fixed) to the third lens barrel 230.

Between the mounting shaft 430 and the tapered follower 330, a spring 530 is disposed which biases the tapered follower 330 toward the inner side in the radial direction of the cam barrel 202.

The mounting shaft 430 and the tapered follower 330 are inserted into the guide groove portion 202h. A tapered surface 330b of the tapered follower 330 biased toward the inner side in the radial direction of the cam barrel 202 by a biasing force of the spring 530 is pressed against the tapered surfaces 202i of the guide groove portion 202h.

The distance between the tapered surfaces 202i on both sides of the guide groove portion 202h and an outer diameter of the tapered surface 330b of the tapered follower 330 respectively decrease (become smaller) toward the inner side in the radial direction of the cam barrel 202. Therefore, the third lens barrel 230 is held at a position where a center of the mounting shaft 430 and tapered follower 330 coincides with the center of the guide groove portion 202h in its width direction. This configuration biases the cam follower 230a mounted on the third lens barrel 230 toward the panel side as shown by an arrow B to always press the cam follower 230a against the cam surface 202g in the optical axis direction.

A cylindrical portion of the tapered follower 330 also engages with the straight groove portion 201b formed in the fixed barrel 201. This engagement prevents rotation of the third lens barrel 230 around the optical axis.

Thus, a lift of the cam surface 202g of the cam barrel 202 rotating around the optical axis moves the third lens barrel 230 in the optical axis direction.

An eccentric cam follower 241b is mounted on the fourth lens barrel 240. The eccentric cam follower 241b is inserted into an insertion hole formed on the fourth lens barrel 240, and is fixed to the fourth lens barrel 240 with a screw 241a. A center of the eccentric cam follower 241b is eccentric (decentered) with respect to a center of the screw 241a.

A cam surface 202j for moving the fourth lens barrel 240 is formed on the inner circumferential part of the cam barrel 202, the cam surface 202j having a smaller inner diameter than that of the cam surface 202g for moving the third lens barrel 230. The cam surface 202j is also parallel to the direction orthogonal to the optical axis.

Moreover, a guide groove portion 202k extending parallel to the cam surface 202j is formed on the cam barrel 202.

On both sides of the guide groove portion 202k in its width direction, tapered surfaces 202l are formed which incline with respect to the direction orthogonal to the optical axis such that a distance therebetween decreases toward the inner side in the radial direction of the cam barrel 202. The eccentric cam follower 241b mounted on the fourth lens barrel 240 is disposed on a same side (screen side) as that of the guide groove portion 202k (that is, that of a tapered follower 340 described later) with respect to the cam surface 202j in the optical axis direction.

A hole portion 240b is formed on an outer circumferential part of the fourth lens barrel 240. The tapered follower 340 is inserted into the hole portion 240b so as to be movable in the direction orthogonal to the optical axis. A mounting shaft 440 is disposed at a central part of the tapered follower 340, and is screwed (fixed) to the fourth lens barrel 240.

Between the mounting shaft 440 and the tapered follower 340, a spring 540 is disposed which biases the tapered follower 340 toward the inner side in the radial direction of the cam barrel 202.

The mounting shaft 440 and the tapered follower 340 are inserted into the guide groove portion 202k. A tapered surface 340b of the tapered follower 340 biased toward the inner side in the radial direction of the cam barrel 202 by a biasing force of the spring 540 is pressed against the tapered surfaces 202l of the guide groove portion 202k.

The distance between the tapered surfaces 202l on both sides of the guide groove portion 202k and an outer diameter of the tapered surface 340b of the tapered follower 340 respectively decrease (become smaller) toward the inner side in the radial direction of the cam barrel 202. Therefore, the fourth lens barrel 240 is held at a position where a center of the mounting shaft 440 and tapered follower 340 coincides with a center of the guide groove portion 202k in its width direction. This configuration biases the eccentric cam follower 241b mounted on the fourth lens barrel 240 toward the panel side as shown by an arrow C to always press the eccentric cam follower 241b against the cam surface 202j in the optical axis direction.

A cylindrical portion of the tapered follower 340 also engages with the straight groove portion 201b formed in the fixed barrel 201. This engagement prevents rotation of the fourth lens barrel 240 around the optical axis.

Thus, a lift of the cam surface 202j of the cam barrel 202 rotating around the optical axis moves the fourth lens barrel 240 in the optical axis direction.

On the cam barrel 202, holes 202q and 202r are formed at two places through which the eccentric cam follower 241b mounted on the fourth lens barrel 240 can be seen from the outside of the cam barrel 202. On a head portion of the eccentric cam follower 241b, a rotation adjustment groove is formed. A tool (not shown) inserted from the outside of the fixed barrel 201 through the straight groove portion 201b formed on the fixed barrel 201 and the holes 202q and 202r formed on the cam barrel 202 is engaged with the rotation adjustment groove, and then the eccentric cam follower 241b is eccentrically rotated around the screw 241a. This enables angle adjustment of the fourth lens barrel 240 to improve optical performance of the projection lens barrel 111 which may deteriorate due to manufacturing errors thereof.

A cam surface 202m for moving the fifth lens barrel 250 is formed on the inner circumferential part of the cam barrel 202, the cam surface 202m having a substantially same inner diameter as that of the cam surface 202j for moving the fourth lens barrel 240. The cam surface 202m is also parallel to the direction orthogonal to the optical axis. The cam follower 250a formed integrally with the fifth lens barrel 250 is in contact with the cam surface 202m in the optical axis direction.

Moreover, a guide groove portion 202n extending parallel to the cam surface 202m is formed on the cam barrel 202.

On both sides of the guide groove portion 202n in its width direction, tapered surfaces 202p are formed which incline with respect to the direction orthogonal to the optical axis such that a distance therebetween decreases toward the inner side in the radial direction of the cam barrel 202. The cam follower 250a mounted on the fifth lens barrel 250 is disposed on a same side (panel side) as that of the guide groove portion 202n (that is, that of a tapered follower 350 described later) with respect to the cam surface 202m in the optical axis direction.

A hole portion 250b is formed on an outer circumferential part of the fifth lens barrel 250. The tapered follower 350 is inserted into the hole portion 250b so as to be movable in the direction orthogonal to the optical axis. A mounting shaft 450 is disposed at a central portion of the tapered follower 350, and is screwed (fixed) to the fifth lens barrel 250.

Between the mounting shaft 450 and the tapered follower 350, a spring 550 is disposed which biases the tapered follower 350 toward the inner side in the radial direction of the cam barrel 202.

The mounting shaft 450 and the tapered follower 350 are inserted into the guide groove portion 202n. A tapered surface 350b of the tapered follower 350 biased toward the inner side in the radial direction of the cam barrel 202 by a biasing force of the spring 550 is pressed against the tapered surfaces 202p of the guide groove portion 202n.

The distance between the tapered surfaces 202p on both sides of the guide groove portion 202n and an outer diameter of the tapered surface 350b of the tapered follower 350 respectively decrease (become smaller) toward the inner side in the radial direction of the cam barrel 202. Therefore, the fifth lens barrel 250 is held at a position where a center of the mounting shaft 450 and tapered follower 350 coincides with a center of the guide groove portion 202n in its width direction. This configuration biases the cam follower 250a mounted on the fifth lens barrel 250 toward the screen side as shown by an arrow D to always press the cam follower 250a against the cam surface 202m in the optical axis direction.

A cylindrical portion of the tapered follower 350 also engages with the straight groove portion 201b formed in the fixed barrel 201. This engagement prevents rotation of the fifth lens barrel 250 around the optical axis.

Thus, a lift of the cam surface 202m of the cam barrel 202 rotating around the optical axis moves the fifth lens barrel 250 in the optical axis direction.

As described above, each of the second to fifth lens barrels 220 to 250 is provided with the pressing mechanism constituted by the mounting shaft, the tapered follower and the spring. The biasing force generated in the optical axis direction by the pressing mechanism always presses the cam follower of each lens barrel against the cam surface, which reduces backlash in the cam mechanism for moving each lens barrel. This configuration enables highly accurate control of the position of each lens barrel in the optical axis direction with the cam surface, and enables suppression of tilting of each lens barrel with respect to the optical axis.

Further, the plural cam surfaces formed for the second to fifth lens barrels (moving barrels) 220 to 250 on the cam barrel 202 include the cam surface (first cam surface) 202d having a largest inner diameter among the plural cam surfaces and the cam surface (second cam surface) 202m having a smallest inner diameter thereamong. The cam surface 202d having the largest inner diameter is formed closest to the screen (at a most-screen side) among the plural cam surfaces. Moreover, the cam surface 202m having the smallest inner diameter is formed closest to the panel (at a most-panel side) among the plural cam surfaces.

Further, in the second lens barrel 220 provided with the cam follower 220a in contact with the cam surface (one of the first and second cam surfaces) 202d, the cam follower 220a is located on the opposite side to that of the tapered follower 320 with respect to the cam surface 202d in the optical axis direction. This configuration presses the cam follower 220a against the cam surface 202d such that the cam follower 220a is drawn to a tapered follower 320 side.

Moreover, in the fifth lens barrel 250 provided with the cam follower 250a in contact with the cam surface (the other of the first and second cam surfaces) 202m, the cam follower 250a is located on the same side as that of the tapered follower 350 with respect to the cam surface 202m in the optical axis direction. This configuration presses the cam follower 250a against the cam surface 202m such that the cam follower 250a is pressed from the tapered follower 320 side.

The above configuration makes it possible to use the both end faces of the cam barrel 202 in the optical axis direction as the cam surfaces 202d and 202m, thereby enabling efficient arrangement of the cam surfaces on the cam barrel 202 even when distances among the plural lens units are narrow.

In addition, this embodiment includes two cam surfaces 202j and 202m as cam surfaces having the smallest inner diameter among the plural cam surfaces formed on the cam barrel 202. Then, two cam followers 241b and 250a in contact with the two cam surfaces 202j and 202m are pressed against the two cam surfaces 202j and 202m in directions (shown by the arrows C and D) facing each other.

This configuration makes it possible to increase the inner diameters of the cam surfaces 202j and 202m formed on the inner circumferential part of the cam barrel 202, which enables formation of an enough space for accommodating the third to fifth lens barrels 230 to 250 inside the cam barrel 202. In other words, this configuration makes it possible to suppress increase of the outer diameter of the cam barrel 202, and that of the projection lens barrel 111.

On the outer circumferential part of the fixed barrel 201, a zoom ring holding portion 201c on which an inner circumferential part 203a of a zoom ring 203 is mounted is formed. The fixed barrel 201 holds the zoom ring 203 rotatably around the optical axis at the zoom ring holding portion 201c. The zoom ring 203 is mounted to the fixed barrel 201 with a bayonet structure. The bayonet structure holds the zoom ring 203 rotatably with respect to the fixed barrel 201 while preventing the zoom ring 203 from moving in the optical axis direction.

A groove portion 203b extending in the optical axis direction is formed on the zoom ring 203. A cam follower 204 which is screwed on the cam barrel 202 engages with the groove portion 203b.

In this configuration, rotation of the zoom ring 203 around the optical axis with respect to the fixed barrel 201 rotates the cam barrel 202 around the optical axis. The rotation of the cam barrel 202 moves the second to fifth lens barrels 220 to 250 in the optical axis direction, and thereby the zooming is performed. The zoom ring 203 is rotated by a driving force generated by a motor (not shown) or a manual operation of a user.

On the outer circumferential part of the fixed barrel 201, a focus ring holding portion 201d on which an inner circumferential part 205a of a focus ring 205 is mounted is formed. The fixed barrel 201 holds the focus ring 205 rotatably around the optical axis at the focus ring holding portion 201d. The focus ring 205 is mounted to the fixed barrel 201 with a bayonet structure. The bayonet structure holds the focus ring 205 rotatably with respect to the fixed barrel 201 while preventing the focus ring 205 from moving in the optical axis direction.

On the focus ring 205, a cam surface 205b for moving the first lens barrel 207 holding the first lens unit L1 in the optical axis direction is formed. The cam surface 205b is formed in parallel with the direction orthogonal to the optical axis. A cam follower 206 mounted on the first lens barrel 207 is in contact with the cam surface 205d in the optical axis direction. The cam follower 206 also engages with a straight groove portion 201e formed on the fixed barrel 201 so as to extend in the optical axis direction.

In this configuration, rotation of the focus ring 205 around the optical axis with respect to the fixed barrel 201 moves the first lens barrel 207 in the optical axis direction, and thereby the focusing is performed. The focus ring 205 is rotated by a driving force generated by a motor (not shown) or a manual operation of a user.

The third lens barrel 230 is provided with an aperture stop 209 disposed between the third lens unit L3 and the fourth lens unit L4. The aperture stop 209 is moved in the optical axis direction together with the third lens barrel 230.

Embodiment 2

Although Embodiment 1 described the projection lens barrel used for the image projection apparatus, a lens apparatus according to the present invention can be used as an image-taking lens apparatus for a camera (image pickup apparatus).

Figure 4:
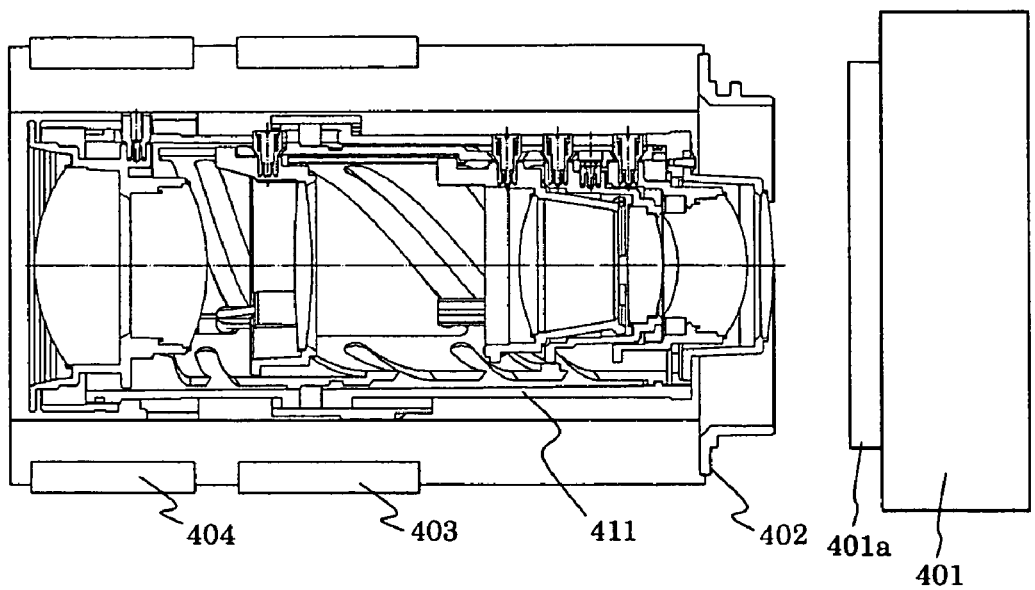
FIG. 4 is a schematic view of an interchangeable lens that is Embodiment 2 of the present invention.

FIG. 4 shows an interchangeable lens apparatus 411, which is a second embodiment (Embodiment 2) of the present invention, used for image taking with a camera 401. The interchangeable lens apparatus 411 of this embodiment uses the configuration described in Embodiment 1 for moving the first to fifth lens barrel in the optical axis direction.

The camera 401 has a mount portion 401a with which a mount portion 402 of the interchangeable lens apparatus 411 is coupled. The coupling makes it possible to perform image taking by a camera system constituted by the camera 401 and the interchangeable lens apparatus 411.

The interchangeable lens apparatus 411 is provided with a zoom operation ring 403 corresponding to the zoom ring described in Embodiment 1 and a focus operation ring 404 corresponding to the focus ring described in Embodiment 1.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

For example, Embodiment 1 described the case where the cam barrel 202 is rotated at a fixed position in the optical axis direction and the second to fifth lens barrels 220 to 250 are moved in the optical axis direction with respect to the cam barrel 202. However, the present invention can be applied to any lens apparatuses in which a first barrel member including a cam surface and a second barrel member provided with a cam follower in contact with the cam surface are relatively rotated, and thereby the first and second barrel members are relatively moved in the optical axis direction. In other words, in embodiments of the present invention, a barrel member rotating around the optical axis may be any one or both of the first and second barrel members, and a barrel member moving in the optical axis direction may also be any one or both of the first and second barrel members.

Moreover, although the description was made of the case where the eccentric cam follower is provided to the fourth lens barrel in the above embodiments, a cam follower may be provided integrally with the fourth lens barrel as in the other lens barrels.

This application claims the benefit of Japanese Patent Application No. 2008-145193, filed on Jun. 2, 2008, which is hereby incorporated by reference herein in its entirety.

What is claimed is:

1. A lens apparatus comprising:
   a lens system;
   a cam barrel including a cam surface; and
   a moving barrel provided with a cam follower in contact with the cam surface, the moving barrel being configured to be moved in a direction of an optical axis of the lens system by rotation of the cam barrel around the optical axis,
   wherein the cam surface is parallel to a direction orthogonal to the optical axis,
   wherein the cam barrel includes a tapered surface inclining with respect to the direction orthogonal to the optical axis, and
   wherein the moving barrel is provided with a tapered follower in contact with the tapered surface and a pressing mechanism configured to bias the tapered follower in the direction orthogonal to the optical axis so as to press the tapered follower against the tapered surface to thereby press the cam follower against the cam surface in the direction of the optical axis.

2. A lens apparatus according to claim 1,
   wherein the lens apparatus comprises a plurality of the moving barrels, wherein the cam barrel includes a plurality of the cam surfaces, the cam followers respectively provided for the moving barrels being in contact with the respective cam surfaces, wherein the cam surfaces includes a first cam surface having a largest inner diameter among the cam surfaces and a second cam surface having a smallest inner diameter among the cam surfaces, wherein, in the moving barrel provided with the cam follower in contact with one cam surface of the first and second cam surfaces, the cam follower is disposed on an opposite side to that of the tapered follower with respect to the one cam surface in the direction of the optical axis, and wherein, in the moving barrel provided with the cam follower in contact with the other cam surface of the first and second cam surfaces, the cam follower is disposed on a same side as that of the tapered follower with respect to the other cam surface in the direction of the optical axis.

3. A lens apparatus according to claim 1, wherein the lens apparatus comprises a plurality of the moving barrels, wherein the cam barrel includes a plurality of the cam surfaces, the cam followers respectively provided for the moving barrels being in contact with the respective cam surfaces, wherein the cam surfaces includes two cam surfaces having a smallest inner diameter among the cam surfaces, and wherein two of the cam followers in contact with the two cam surfaces are pressed against the two cam surfaces in directions facing each other.

4. A lens apparatus comprising:

a lens system;

a first barrel member including a cam surface; and a second barrel member provided with a cam follower in contact with the cam surface, wherein the first and second barrel members are relatively moved in a direction of an optical axis of the lens system by relative rotation of the first and second barrel members around the optical axis, wherein the cam surface is parallel to a direction orthogonal to the optical axis, wherein the first barrel member includes a tapered surface inclining with respect to the direction orthogonal to the optical axis, and wherein the second barrel member is provided with a tapered follower in contact with the tapered surface and a pressing mechanism configured to bias the tapered follower in the direction orthogonal to the optical axis so as to press the tapered follower against the tapered surface to thereby press the cam follower against the cam surface in the direction of the optical axis.

5. An image projection apparatus comprising:

an image-forming element configured to form an original image; and a lens apparatus configured to project light from the image-forming element onto a projection surface, wherein the lens apparatus comprises:

a lens system;

a cam barrel including a cam surface; and a moving barrel provided with a cam follower in contact with the cam surface, the moving barrel being configured to be moved in a direction of an optical axis of the lens system by rotation of the cam barrel around the optical axis, wherein the cam surface is parallel to a direction orthogonal to the optical axis, wherein the cam barrel includes a tapered surface inclining with respect to the direction orthogonal to the optical axis, and wherein the moving barrel is provided with a tapered follower in contact with the tapered surface and a pressing mechanism configured to bias the tapered follower in the direction orthogonal to the optical axis so as to press the tapered follower against the tapered surface to thereby press the cam follower against the cam surface in the direction of the optical axis.

6. An image projection apparatus comprising:

an image-forming element configured to form an original image; and a lens apparatus configured to project light from the image-forming element onto a projection surface, wherein the lens apparatus comprises:

a lens system;

a first barrel member including a cam surface; and a second barrel member provided with a cam follower in contact with the cam surface, wherein the first and second barrel members are relatively moved in a direction of an optical axis of the lens system by relative rotation of the first and second barrel members around the optical axis, wherein the cam surface is parallel to a direction orthogonal to the optical axis, wherein the first barrel member includes a tapered surface inclining with respect to the direction orthogonal to the optical axis, and wherein the second barrel member is provided with a tapered follower in contact with the tapered surface and a pressing mechanism configured to bias the tapered follower in the direction orthogonal to the optical axis so as to press the tapered follower against the tapered surface to thereby press the cam follower against the cam surface in the direction of the optical axis.

* * * * *